US007229068B2

(12) United States Patent
Moilanen

(10) Patent No.: US 7,229,068 B2
(45) Date of Patent: Jun. 12, 2007

(54) VANE CLAMP ASSEMBLY

(75) Inventor: Steven M. Moilanen, Fort Wayne, IN (US)

(73) Assignee: PHd, Inc., Fort Wayne, IN (US)

( * ) Notice: Subject to any disclaimer, the term of this patent is extended or adjusted under 35 U.S.C. 154(b) by 0 days.

(21) Appl. No.: 11/072,009

(22) Filed: Mar. 4, 2005

(65) Prior Publication Data

US 2005/0194729 A1 Sep. 8, 2005

Related U.S. Application Data

(60) Provisional application No. 60/550,728, filed on Mar. 5, 2004.

(51) Int. Cl.
*B23Q 3/08* (2006.01)

(52) U.S. Cl. .......................... 269/32; 269/27; 269/228

(58) Field of Classification Search .................. 269/32, 269/24, 27, 228, 201, 20
See application file for complete search history.

(56) References Cited

U.S. PATENT DOCUMENTS 4,768,821 A 9/1988 Hucul et al.
6,488,273 B2 * 12/2002 Sawdon et al. ............... 269/20
2004/0130083 A1 7/2004 Moilanen et al.
2005/0194729 A1 * 9/2005 Moilanen ..................... 269/32

OTHER PUBLICATIONS

CRANE, Crane Actuators, Electric Pneumatic Matryx® Vane, catalog, © 2002 Crane Co. (CV-1).

MICROMATIC, Hydraulic Rotary Actuators, catalog, Revised Jun. 2002.

Kinetrol Ltd, Kinetrol rotary actuators, catalog, KF—84 Jan. 2002.

International Search Report, Aug. 30, 2006.

* cited by examiner

*Primary Examiner*—Lee D. Wilson
(74) *Attorney, Agent, or Firm*—Barnes & Thornburg LLP

(57) ABSTRACT

A clamp assembly having a body, a power supply, a vane, jaw arm and stop is provided. The power supply is coupled to the body, and the vane located in the body. The power supply pivots the vane about an axis between first and second positions. The jaw arm is coupled to and movable with the vane. The stop limits the movement of the jaw arm during a loss of power to the vane.

16 Claims, 7 Drawing Sheets

VANE CLAMP ASSEMBLY

RELATED APPLICATIONS

The present application is related to and claims priority to U.S. Provisional Patent Application, Ser. No. 60/550,728, filed on Mar. 5, 2004, entitled VANE CLAMP ASSEMBLY. The subject matter disclosed in that provisional application is hereby expressly incorporated into the present application by refrence.

TECHNICAL FIELD

The present disclosure relates to clamps and grippers, and more particularly to such clamps and grippers that employ a powered vane to move a jaw arm between open and closed positions.

BACKGROUND AND SUMMARY

Actuated parts, grippers, and clamps are known. Typically, such clamps use pneumatic actuation to translate linear motion into rotational motion through a series of cams or links coupled to both a linearly traveling piston rod and a rotating jaw arm. Such clamps can provide a substantial gripping force, but sometimes that force does not become substantial until the final moments of the stroke. Often this can be the last thousands of an inch of a stroke. Vane clamps, in contrast, are actuated by fluid pressure engaging a vane, thereby rotating the same which, in turn, rotates a coupled jaw arm. This produces a more powerful force across a greater range of the stroke. This is useful when using tips that require sufficient torque at a position on the stroke that is not the final thousandth of an inch. For example, compliant tips having a variable gripping surface to hold a variably-shaped workpiece, the torque required needs to be substantial, possibly as much as a half inch above the end of the stroke, in some cases. This allows the first contact between the compliant tip and the workpiece to receive sufficient torque.

Typical vane clamps, however, may lose gripping power when the fluid supply is lost. Such clamps cannot lock or hold the gripper arms in place unless constant force is applied to the vane. Without power to the vane, the jaw arm will be able to move freely. This, obviously, can have a detrimental impact on certain manufacturing-line applications, when a gripping force is desired under loss-of-power conditions. It would, thus, be beneficial to provide an improved vane clamp that addresses at least one or more of these issues.

Accordingly, an illustrative embodiment of the present disclosure provides a clamp assembly which comprises a body, a power supply, a vane, a jaw arm and a stop. The power supply is coupled to the body, and the vane located in the body. The power supply pivots the vane about an axis between first and second positions. The jaw arm is coupled to and movable with the vane. The stop limits the movement of the jaw arm during a loss of power to the vane.

The above and other illustrative embodiments may also comprise: the stop further comprising a clutch assembly that prevents movement of the jaw arm during loss of power from the power supply; a cam member that engages a key attached to the vane; the jaw arm being engagable with the cam member; the vane moving the cam member that moves the jaw arm; at least one stop member located adjacent the key and cam member wherein the stop member limits movement of the cam member when power is lost; the stop member being a dowel; the cam member having at least one recess disposed therein configured to receive the dowel; the power supply moving the vane which moves the key which engages the dowel, wherein the recess receives the dowel to allow movement of the jaw arm; a shaft being engagable with the cam member and the jaw arm such that movement of the cam moves the shaft which pivots the jaw arm; the shaft defining the axis, and being disposed through but not engaging the vane; and the shaft being engagable with a member that rotates the shaft to move the jaw arm when power is lost.

Another illustrative embodiment of the present disclosure provides a clamp assembly which comprises a power supply, a jaw arm, a shaft, a rotating body and at least one stop member. The shaft is attached to the jaw arm. The rotating body is engagable with the shaft and the power supply to pivot the jaw arm about an axis between open and closed positions. The at least one stop member is engagable with the rotating body to limit movement of the jaw arm during a loss of the power supply.

The above and other illustrative embodiments may also comprise: both the shaft and the rotating body comprising a plurality of teeth disposed thereon such that as the power supply moves the rotating body the teeth on the rotating body engages the teeth on the shaft to rotate the shaft which moves the jaw arm; a manual override that engages the shaft to move the jaw arm during loss of the power supply; and at least one stop member engagable with the rotating body to selectively prevent movement of the jaw arm during the loss of the power supply.

Another illustrative embodiment of the present disclosure provides a clamp comprising a pivoting means that is movable about an axis in response to a power supply; a jaw arm coupled to and movable with the pivoting means; and a means for limiting movement of the jaw arm when the power supply to the pivoting means is lost.

Additional features and advantages of the clamp will become apparent to those skilled in the art upon consideration of the following detailed description of the illustrated embodiment exemplifying the best mode of carrying out the clamp as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the clamp, and such exemplification is not to be construed as limiting the scope of the clamp in any manner.

DETAILED DESCRIPTION OF THE DRAWINGS

Figure 1:
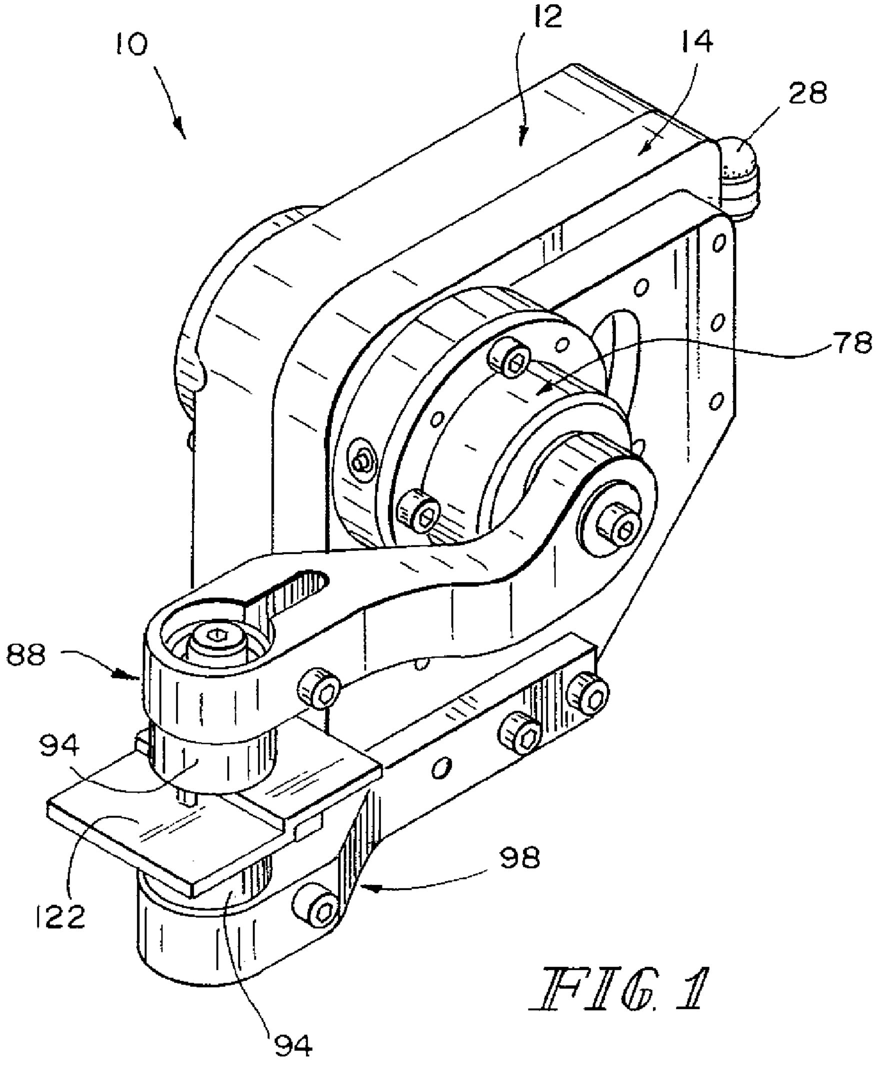
FIG. 1 is a perspective view of an illustrative embodiment of a vane clamp assembly pursuant the present disclosure.

A perspective view of an illustrative embodiment of a vane clamp assembly 10 is shown in FIG. 1. Arms 88 and 98 extend from bodies 12, 14, and at least arm 88 is configured to pivot with respect to the body to grip a work piece. In this illustrative embodiment, jaw tips 94 are variable tips to allow gripping of a work piece of irregular shape. It is appreciated that although arm 98 is shown to be stationery with respect to arm 88, arm 98 may be configured to move or pivot independently of arm 88. It is further appreciated that a clamp of this type provides a more constant force during the length of stroke, so that a gripping force can be applied to work pieces having uneven surfaces, meaning that certain portions of tip 94 may begin gripping a work piece at a different point along the stroke than other portions of tip 94.

Figure 2:
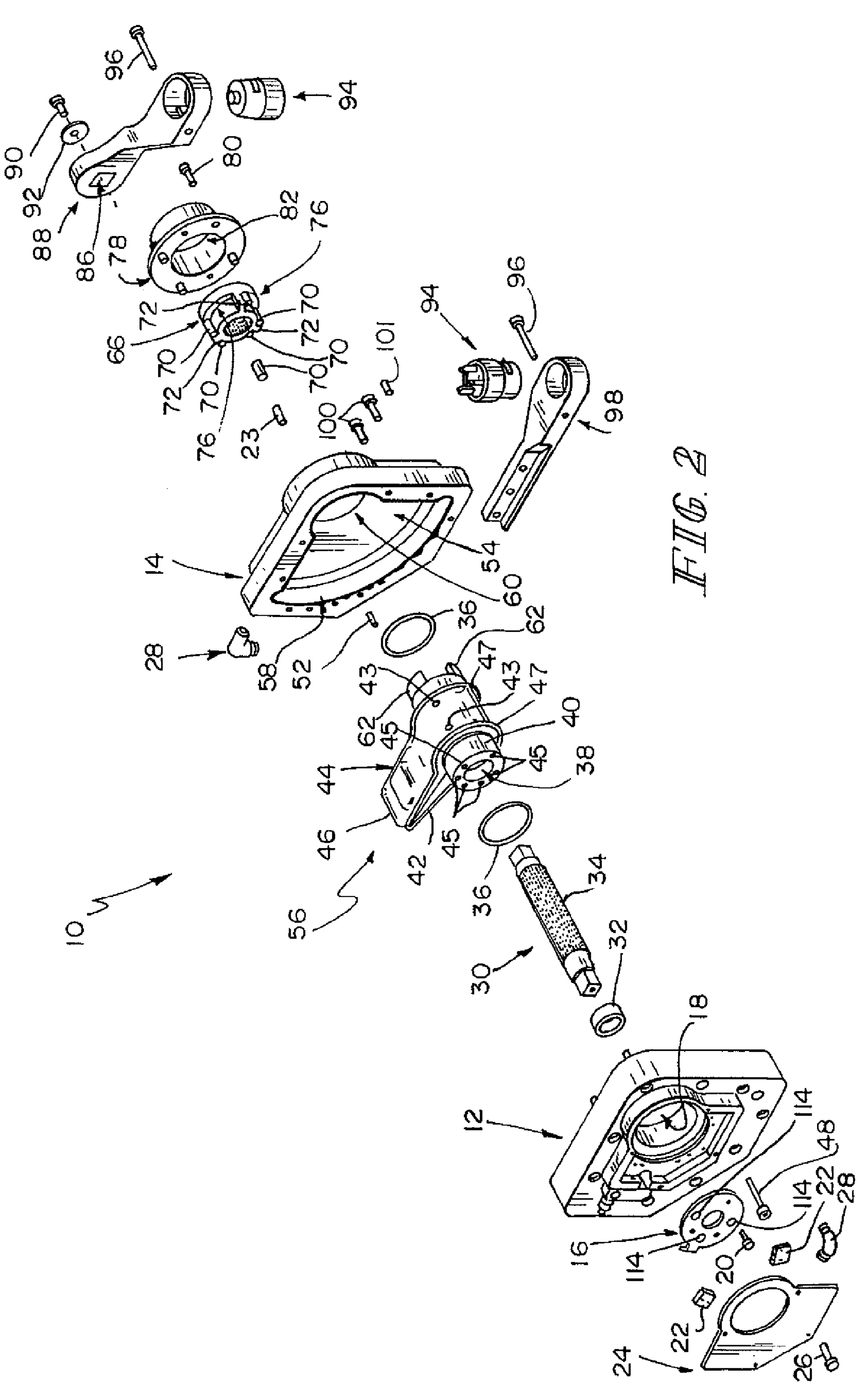
FIG. 2 is an exploded perspective view of the vane clamp assembly of FIG. 1.

An exploded perspective view of an illustrative embodiment of vane clamp assembly 10 is shown in FIG. 2. Vane clamp assembly 10 illustratively comprises bodies 12, 14. Illustratively, target 16 fits over opening 18 of body 12, and is coupled to vane hub 40 with fasteners 20. At least one switch 22 is attached to body 12, though a plurality of switches 22 is illustratively shown herein. Switch cover 24 is attached to body 12 through fasteners 26, also as illustratively shown herein. Pressure inlet elbow 28 is also illustratively attached to body 12.

Output shaft 30 is illustratively shown disposed through bearing 32, opening 18, target 16, and switch cover 24. Output shaft 30 illustratively comprises teeth 34 which allow output shaft 30 to be rotationally driven through a correspondingly-toothed mechanism. Output shaft 30 is also disposed through O-rings 36 and through opening 38 of vane hub 40. Opening 38 is illustratively formed to allow free rotation of vane assembly 56 around output shaft 30. O-rings 36 are illustratively formed to fit onto vane hub 40. Vane members 42, 44 are located about vane hub 40 to form vane 46 of vane assembly 56. Each vane member 42, 44 illustratively comprises a plurality of fasteners 43 to affix the vane members 42, 44 around vane hub 40. Each vane member 42, 44 also comprise a plurality of seals 47 that seal vane members 42, 44 within chamber 54 of bodies 12 and 14. Bodies 12, 14 may illustratively be connected together through a plurality of fasteners 48 and dowels 52 as shown. As bodies 12, 14 are brought together, output shaft 30 is illustratively disposable through opening 38 of vane hub 40 and opening 60 of body 14. Coupling of bodies 12, 14 brings vane hub 40 into close proximity with target 16.

Also illustratively shown is body 14 comprising a portion of chamber 54 with body 12 comprising the other portion of chamber 54. (See also, FIGS. 8 and 9.) Chamber 54 is illustratively formed to receive vane assembly 56, when bodies 12, 14 are coupled together. Sealant may be applied to edge 58 of chamber 54 to prevent fluid from leaking exterior of the chamber. Body 14 also includes elbow pressure inlet 28 attached to provide fluid into chamber 54.

Vane hub 40 comprises key 62 extending therefrom. Vane hub 40 may also comprise a plurality of keys 62, for example, as shown therein. Opening 60 is formed to allow output shaft 30 to be disposed therethrough, but also keys or keys 62. Output shaft 30 extends through opening 60 farther than keys 62. Output shaft 30 is then able to pass through opening 64 of cam member 66. Opening 64 comprises teeth 68 illustratively corresponding to the teeth 34 of output shaft 30. This allows teeth 34 to engage teeth 68 to rotate cam member 66 as output shaft 30 is rotated, and vice versa. Cam member 66 illustratively comprises a plurality of stop members or dowel pins 70. It is appreciated, however, that dowels 70 are of illustrative configuration, and in other embodiments the stop member can be of differing configuration such as spherical, for example. Each dowel pin 70 is located adjacent a tab 72 on cam member 66. Springs 74 are located illustratively within tabs 72 and adjacent respective dowel pins 70. Cam member 66 also illustratively comprises spaces 76 between dowel pins 70. Each space 76 illustratively accommodates a key 62 therein. This allows rotation of vane assembly 56 in chamber 54 to rotate cam member 66 through the interaction of keys 62 located in spaces 76 and engaging dowels 70 and tabs 72, for example. Illustratively, cam member 66 rotates output shaft 30 via engagement of teeth 34, 68.

Race 78 is aligned and attached to body 14 via roll pins 23 and fasteners 80. Race 78 comprises opening 82 which allows cam member 66 to fit within it and output shaft 30 to fit therethrough. Output shaft 30 extends through race 78 so that end 84 fits into opening 86 of jaw arm 88. Illustratively, fastener 90 may fit through washer 92 fastening output shaft 30 to jaw arm 88. Jaw arm 88 can then move via rotation of output shaft 30. Jaw arm 88 may illustratively comprise jaw tip 94 which can be attached to jaw arm 88 through fastener 96. Vane clamp assembly 10 also illustratively comprises jaw arm 98 which is attached to body 14 through fasteners 100 and dowel pin 101 as illustratively shown therein. It is appreciated that a plurality of fasteners 100 and dowel pins 101 may be used for this fastening. Similar to jaw arm 88, jaw arm 98 comprises jaw tip 94 attached through fastener 96. In this illustrative embodiment, jaw tips 94 of jaw arms 88, 98 are opposable and may be used to grip an assortment of workpieces through movement of jaw arm 88. (See, also, FIGS. 1, 13 and 14.) It is appreciated, however, that in other embodiments, any variety of tips can be attached to jaw arms 88, 98.

Figure 5:
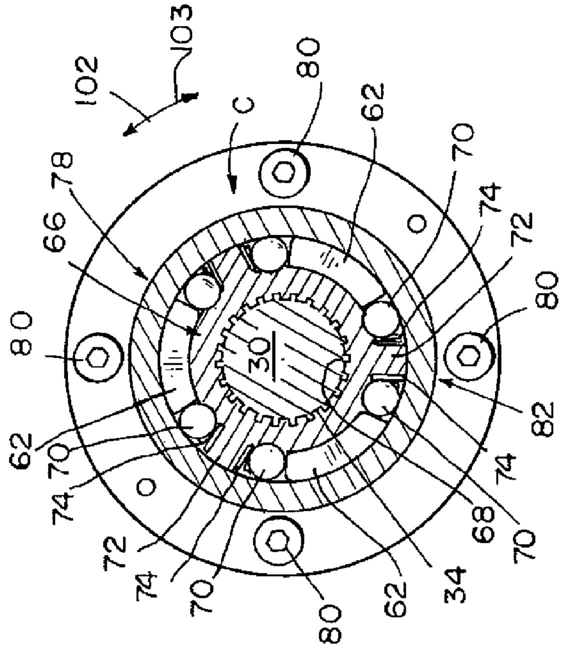
FIG. 5 is a detail view of a portion of the vane clamp from detail B of FIG. 4.
Figure 6:
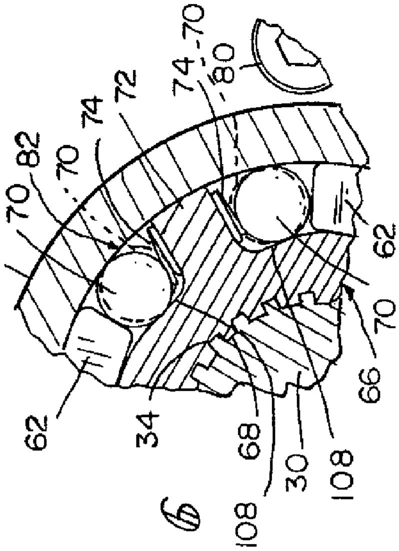
FIG. 6 is a detail view of the vane clamp assembly from detail C of FIG. 5.
Figure 3:
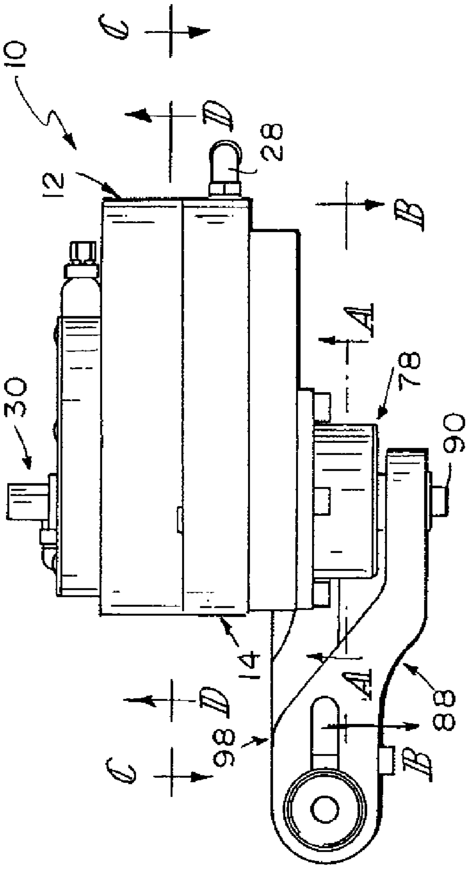
FIG. 3 is a top view of the vane clamp assembly of FIG. 1.
Figure 4:
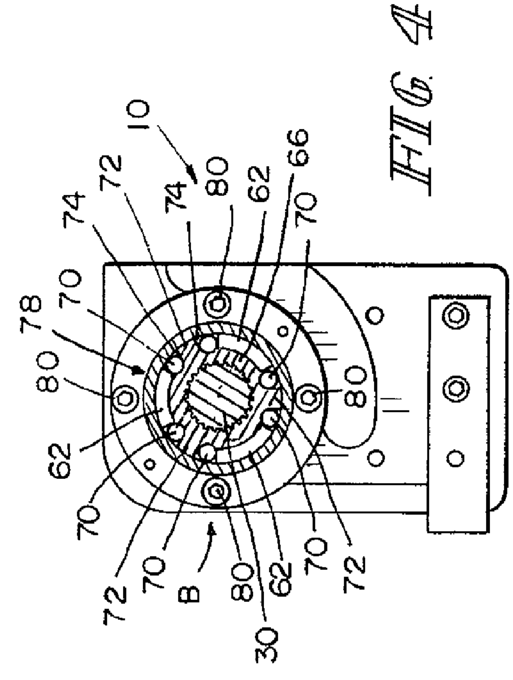
FIG. 4 is a cross-sectional view of the vane clamp along the lines of A-A of FIG. 3.

The interaction of cam member 66, keys 62, and output shaft 30 is shown in FIGS. 3 through 6. A top view of vane clamp assembly 10 is illustratively shown in FIG. 3. Cross-sectional views of FIGS. 3 and 4 illustratively show the specific interaction of output shaft 30 and cam member 66. Illustratively shown in FIGS. 4 and 5 is race 78 fastened to body 14 through fasteners 80. In this illustrative embodiment cam member 66 comprises six (6) dowel pins 70. Each dowel pin 70 is adjacent a tab 72 of cam member 66 with a spring 74 located therebetween. Illustratively, a bore extends through each tab 72 with a spring 74 disposed therein. Each spring 74 acts on two dowel pins 70 in opposable directions 102, 103 away from tabs 72. Keys 62, extending from vane hub 40, are illustratively shown in FIGS. 4 through 6 located in spaces 76 of cam member 66, with a dowel pin 70 adjacent end.

This configuration allows the following operation: When the vane clamp assembly 10 is stationary and no fluid is being supplied to chamber 54, the vane assembly is illustratively free to rotate around output shaft 30. With no other forces acting on them in this state, dowel pins 70 are forced outwardly, away from the closest respective tab 72 via spring 74 in directions 102, 103. As shown in the detailed view of FIG. 6, when cam member 66 is not moving, the dowel pins 70 are pushed by springs 74 in directions 102, 103 allowing each dowel pin 70 to be wedged between cam member 66 and race 78. The diameter of dowel pin 70 is such that it will wedge tightly between the two surfaces as shown. Each dowel pin 70 does this, which causes cam member 66 to lock into place with respect to the race 78. This creates a "clutch" effect, whereby cam member 66 is locked into place with respect to race 78 while no pressure is being sent into chamber 54 to move or hold vane 46. As a consequence, the jaw arm 88 is prevented from moving. And, therefore, if jaw arms 88 and 98 are holding a workpiece, they will continue to do so, even under loss of power to the vane.

Conversely when vane 46 is actuated, vane hub 40 rotates which rotates keys 62 in direction 104 or 106. When keys 62 rotate, they press against a dowel pin 70 in the direction of rotation. This causes the dowel pin 70 to be pushed inwardly in respective directions 102 or 103, depending on the direction of rotation, toward tab 72. A recesses 108 is located at the base of each side of each tab 72. As each key 62 rotates, each respective dowel pin 70 is forced into the recesses 108. This releases the wedging effect between cam member 66 and race 78 by dowel pins 70. Illustratively, the dowel pins that are acted upon by keys 62 are pushed into recesses 108. These dowel pins 70 that are located opposite the pushed dowel pins 70, are acted upon by the rotational force that cause them to be pushed into recess 108 by the surface of race 78. Dowel pins 70 overcome the bias of spring 74 and seat into recess 108 allowing cam member 66 to rotate unencumbered. The engagement of teeth 34 and 68 then rotates output shaft 30 and, in turn, jaw arm 88. When chamber 54 again becomes unpressurized, cam member 66 will be locked into position with respect to race 78 due to the dowel pins 70 and springs 74.

Figure 7:
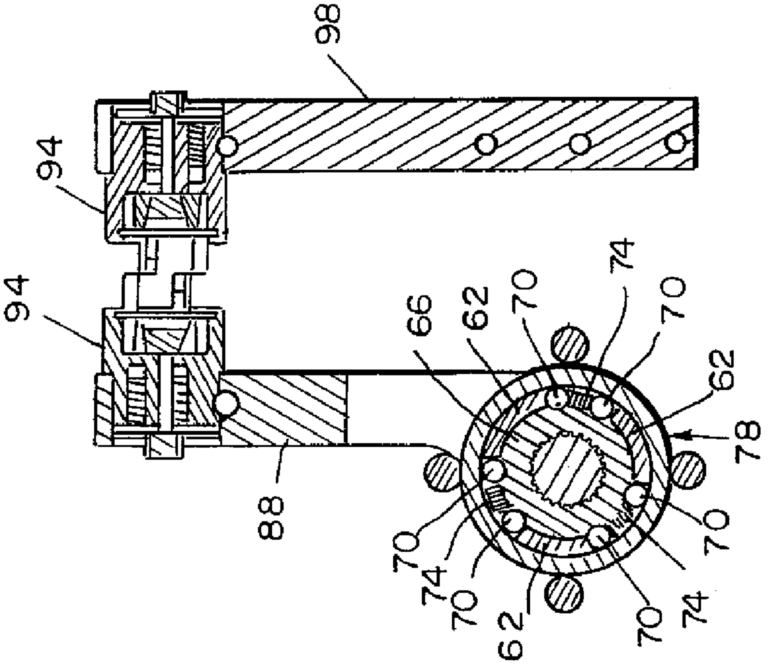
FIG. 7 is a side cross-sectional view of the vane clamp assembly taken along lines B-B of FIG. 3.
Figure 8:
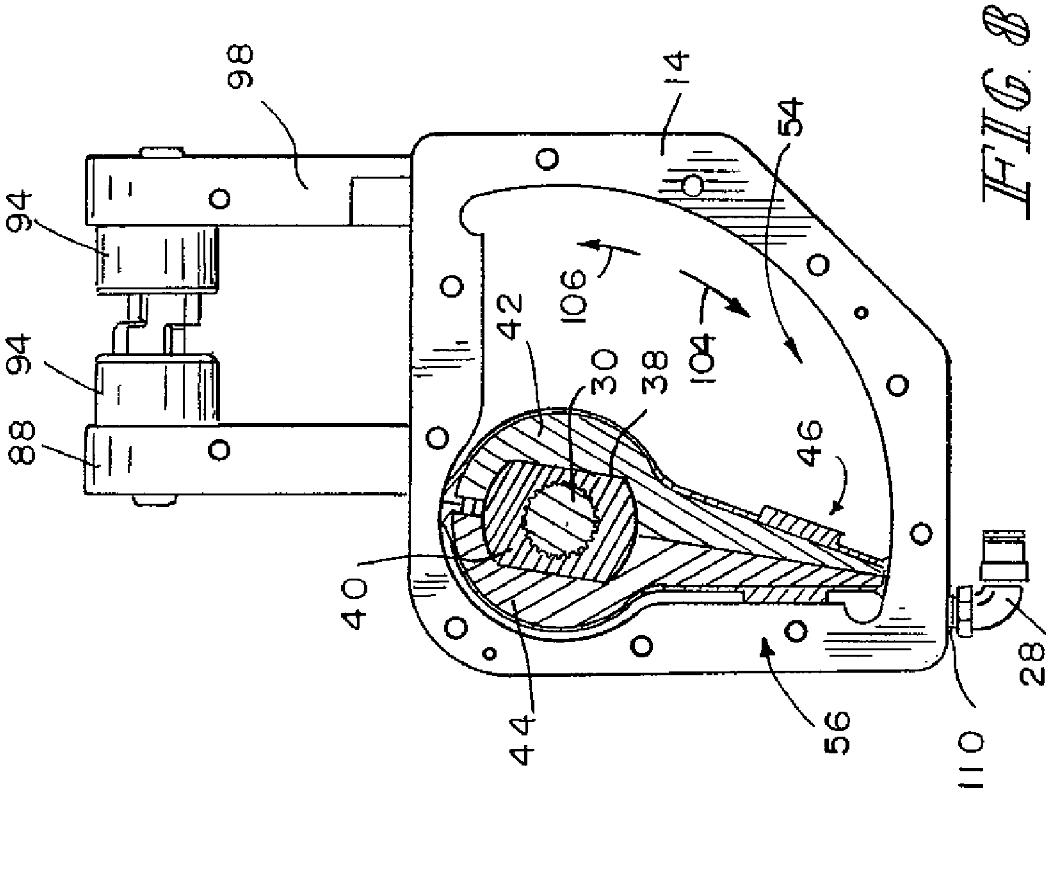
FIG. 8 is a side cross-sectional view of the vane clamp assembly taken along lines C-C of FIG. 3 and showing a vane located in one position within the body.
Figure 9:
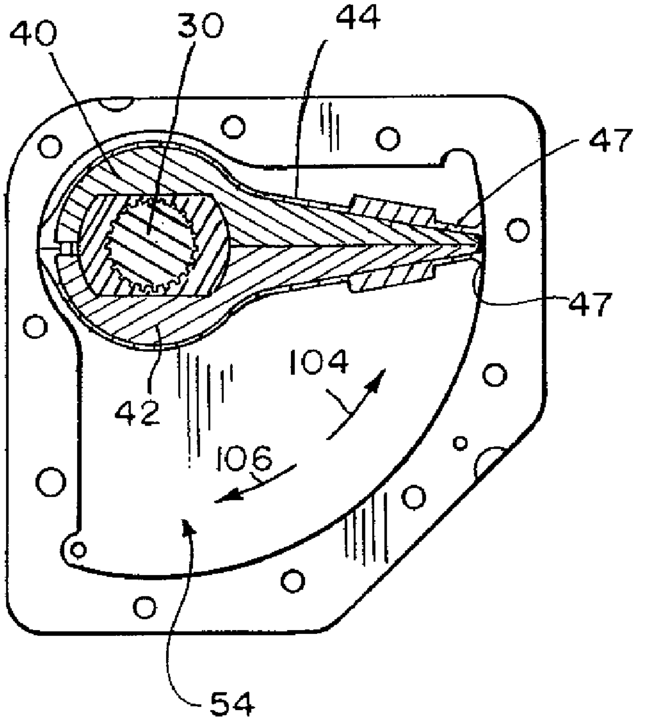
FIG. 9 is another cross-sectional view of the vane clamp assembly taken along lines D-D of FIG. 3 and showing the vane located in another position within the body.

Several views illustratively showing how the vane assembly 56 interacts with cam member 66 and output shaft 30 are shown in FIGS. 7 through 9. FIG. 7 specifically shows how springs 74 sit on cam member 66. The sectional view is such that tabs 72 are not shown, allowing springs 74 to be shown instead. Two dowel pins 70 each share a spring 74 which forces them in direction 102, 103. The movement of vane assembly 56 in chamber 54 is shown in FIGS. 8 and 9. Only one pressure inlet 110 is shown in FIG. 8. With vane 46 in the position shown therein, pressure sent into chamber 54 via pressure inlet elbow 28 and pressure inlet 110 moves vane 46 in direction 106. When vane 46 moves in direction 106, as previously discussed, keys 62 push cam member 66 in direction 106 as well. This motion, rotates output shaft 30 and ultimately jaw arm 88. In this illustrative embodiment opening 38 of vane hub 40 does not have teeth to interact with corresponding teeth 34 on output shaft 30. When fluid is sent through another inlet (not shown), vane 46 is movable in direction 104 as shown in FIG. 9. This movement rotates cam member 66, output shaft 30, and jaw arm 88 in direction 104 as well. The motion of vane 46 rotating jaw arm 88 helps create a constant torque along much of the stroke.

Figure 11:
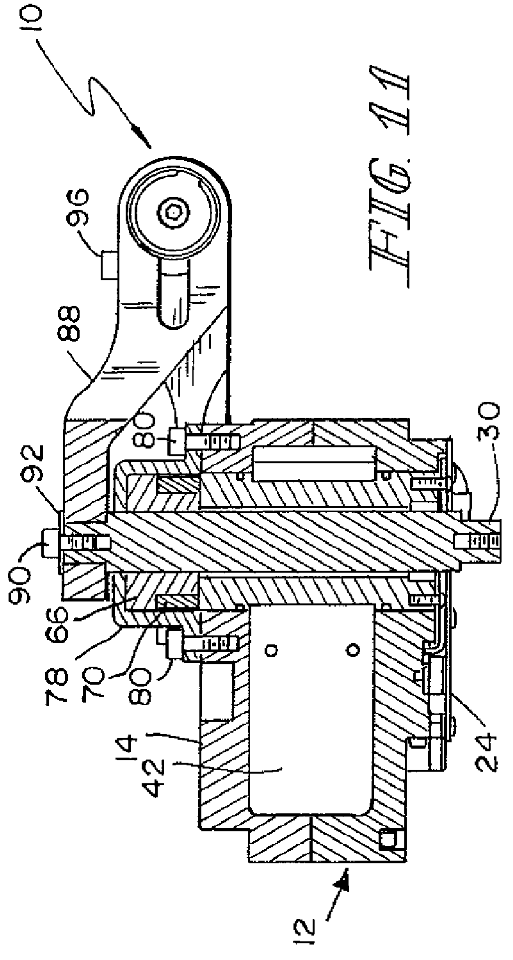
FIG. 11 is a top cross-sectional view of the vane clamp assembly taken along lines E-E of FIG. 10.
Figure 12:
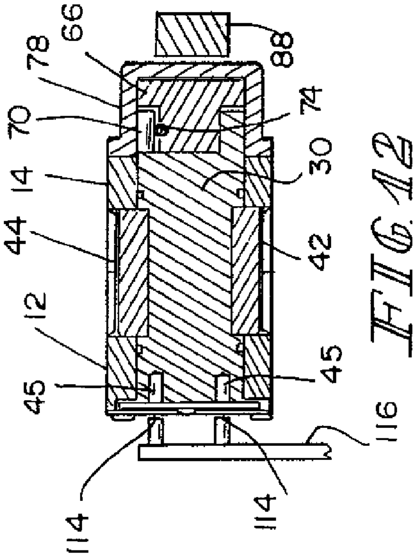
FIG. 12 is a facing cross-sectional view of a portion of the vane clamp assembly taken along lines F-F of FIG. 10.
Figure 10:
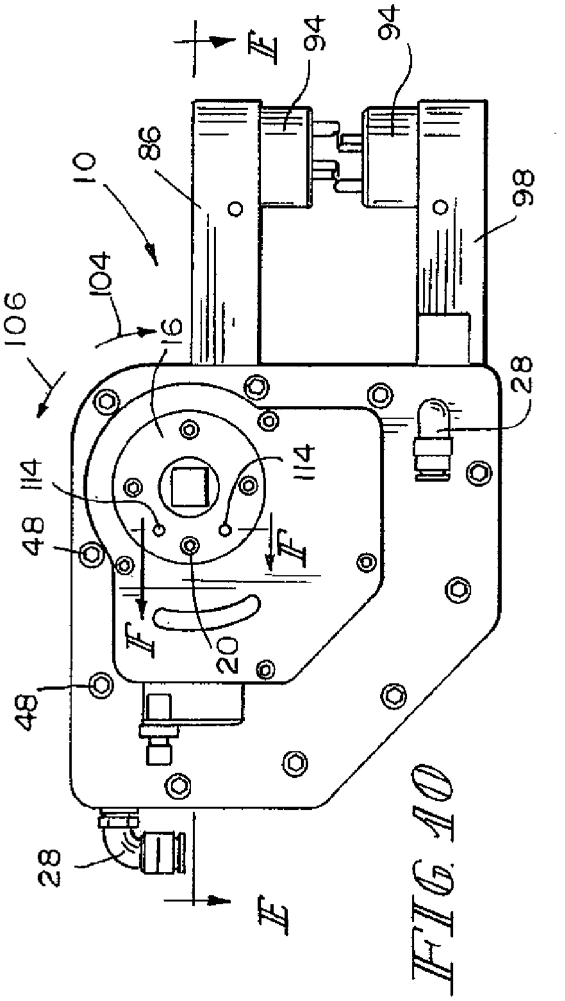
FIG. 10 is a side view of the vane clamp assembly of FIG. 1.

An illustrative embodiment of vane clamp assembly 10 is shown in FIGS. 10 through 12, allowing a manual override of the jaw arm 88. As previously mentioned regarding the illustrative embodiment of FIGS. 3 through 6, output shaft 30 and jaw arm 88 do not rotate without pressure fluid moving vane assembly 56 in chamber 54. This can be overridden by allowing vane hub 40 to be manually driven which rotates cam member 66, output shaft 30, and ultimately jaw arm 88. Vane hub 40 illustratively comprises manual drive ports 45, which may be accessed through openings 114 in target 16. FIG. 12 illustratively shows a wrench 116 engaging manual drive ports 45. As wrench 116 turns the manual drive ports 45, vane assembly 56 rotates. This rotation causes cam member 66, output shaft 30, and jaw arm 88 to rotate as well. This method of rotation allows jaw arm 88 to be rotated without pressurizing chamber 54. An illustrative second pressure inlet 28 allowing vane 46 to move in direction 104, is shown in FIG. 10.

Figure 14:
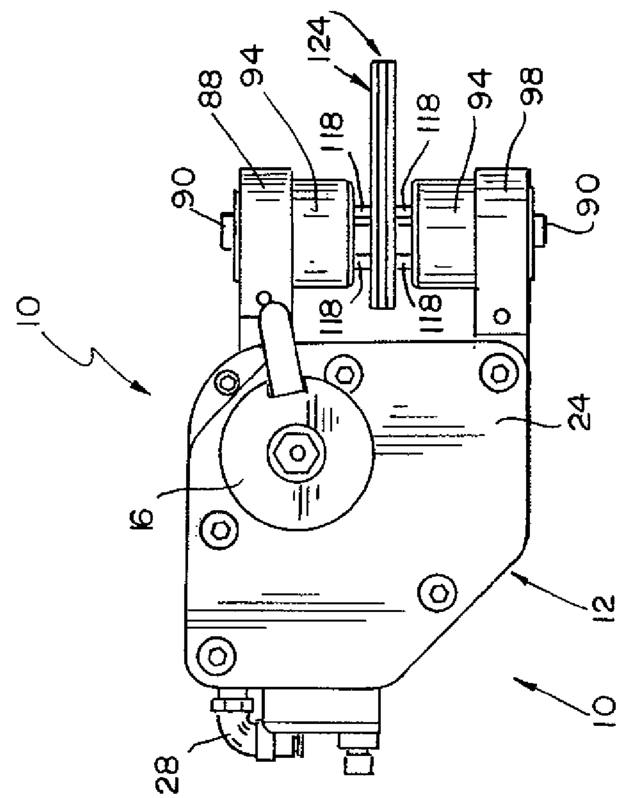
FIG. 14 is another side view of the vane clamp assembly shown gripping work pieces of differing thicknesses.
Figure 13:
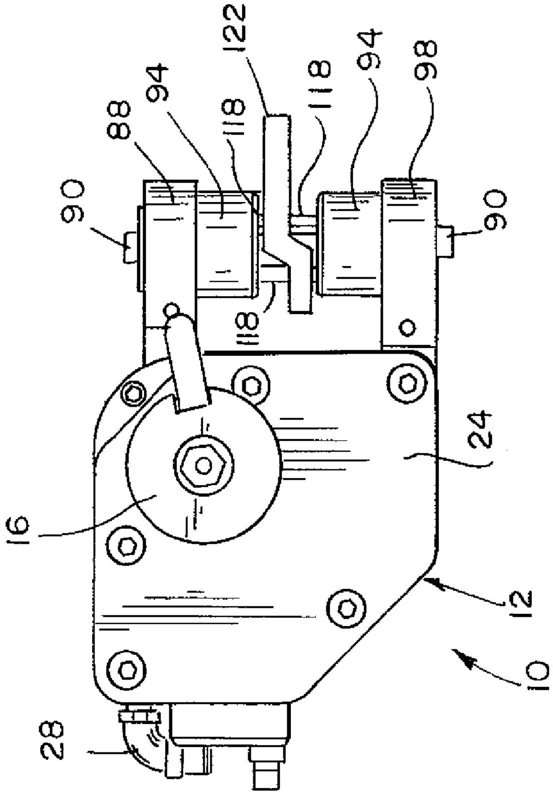
FIG. 13 is another side view of the vane clamp assembly shown gripping a work piece of irregular thickness.

Side views of vane clamps 10 gripping workpieces of irregular and differing thicknesses are shown in FIGS. 13 and 14, respectively. Illustratively, jaw tips 94 have adjustable jaw prongs 118 to allow jaw arms 88, 98 to grip these variably-shaped workpieces 122, 124. Particularly notable is how the jaw prongs 118 may be adjusted to grip workpieces 124 of different thicknesses as shown in FIG. 14.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A clamp assembly comprising:

a body;

a power supply coupled to the body;

a vane located in the body;

wherein the power supply pivots the vane about an axis between first and second positions;

a jaw arm coupled to and movable with the vane; and a clutch assembly that limits movement of the jaw arm during a loss of power to the vane;

wherein the clutch assembly comprises a cam member that engages a key coupled to the vane.

2. The clamp assembly of claim 1, wherein the jaw arm is engagable with the cam member.

3. The clamp assembly of claim 2, wherein movement of the vane moves the cam member that moves the jaw arm.

4. The clamp assembly of claim 3, further comprising at least one stop member located adjacent the key and cam member wherein the stop member limits movement of the cam member when power is lost.

5. The clamp assembly of claim 4, wherein the stop member is a dowel.

6. The clamp assembly of claim 5, wherein the cam member has at least one recess disposed therein configured to receive the dowel.

7. The clamp assembly of claim 6, wherein the power supply moves the vane which moves the key which engages the dowel, and wherein the recess receives the dowel to allow movement of the jaw arm.

8. The clamp assembly of claim 1, further comprising a shaft that is engagable with the cam member and the jaw arm such that movement of the cam moves the shaft which pivots the jaw arm.

9. The clamp assembly of claim 8, wherein the shaft defines the axis, and is disposed through but does not engage the vane.

10. The clamp assembly of claim 8, wherein the shaft is engagable with a member that rotates the shaft to move the jaw arm when power is lost.

11. A clamp assembly comprising:

a power supply;

a jaw arm;

a shaft attached to the jaw arm;

a rotating body that is engagable with the shaft and the power supply to pivot the jaw arm about an axis between open and closed positions;

wherein the shaft and the rotating body comprise a plurality of teeth disposed thereon such that as the power supply moves the rotating body the teeth on the rotating body engages the teeth on the shaft to rotate the shaft which moves the jaw arm; and at least one stop member engagable with the rotating body to limit movement of the jaw arm during a loss of the power supply.

12. The clamp assembly of claim 11, further comprising a manual override that engages the shaft to move the jaw arm during the loss of the power supply.

13. The clamp assembly of claim 11, further comprising at least one stop member engagable with the rotating body to selectively prevent movement of the jaw arm during the loss of the power supply.

14. The clamp assembly of claim 13, wherein the stop member is a dowel.

15. The clamp assembly of claim 14, wherein the rotating body has a recess disposed therein configured to receive the dowel.

16. A clamp comprising:

a pivoting means that is movable about an axis in response to a power supply;

a jaw arm coupled to and movable with the pivoting means; and a means for limiting movement of the jaw arm when the power supply to the pivoting means is lost.

* * * * *